(12) United States Patent
Hong

(10) Patent No.: US 9,589,093 B2
(45) Date of Patent: Mar. 7, 2017

(54) MULTILEVEL VIA PLACEMENT WITH IMPROVED YIELD IN DUAL DAMASCENE INTERCONNECTION

(71) Applicant: Texas Instruments Incorporated, Dallas, TX (US)

(72) Inventor: Qi-Zhong Hong, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/577,195

(22) Filed: Dec. 19, 2014

(65) Prior Publication Data

US 2015/0186588 A1   Jul. 2, 2015

Related U.S. Application Data

(60) Provisional application No. 61/921,891, filed on Dec. 30, 2013.

(51) Int. Cl.
*H01L 21/44* (2006.01)
*G06F 17/50* (2006.01)
*H01L 23/522* (2006.01)

(52) U.S. Cl.
CPC ...... *G06F 17/5072* (2013.01); *G06F 17/5081* (2013.01); *H01L 23/5226* (2013.01); *H01L 2924/0002* (2013.01)

(58) Field of Classification Search
CPC ......... H01L 2924/0002; H01L 2924/00; H01L 21/76843; H01L 21/76877; H01L 29/665; H01L 21/76834; H01L 21/28052; H01L 21/28518; H01L 21/76856; H01L 2924/1305; H01L 2924/1306; H01L 29/6659
See application file for complete search history.

(56) References Cited

U.S. PATENT DOCUMENTS

| | | | | |
|---|---|---|---|---|
| 6,660,650 B1* | 12/2003 | Konecni | ............ | H01L 21/7684 257/E21.011 |
| 2002/0081837 A1* | 6/2002 | Hong | ................ | H01L 21/76877 438/637 |
| 2004/0238853 A1* | 12/2004 | Hong | .................. | H01L 23/3192 257/213 |
| 2006/0081965 A1* | 4/2006 | Ruan | .................. | H01L 21/3105 257/632 |

* cited by examiner

*Primary Examiner* — Robert Bachner
(74) *Attorney, Agent, or Firm* — Jacqueline J. Garner; Charles A. Brill; Frank D. Cimino

(57) ABSTRACT

A method of operating a computer system to improve via electromigration in an integrated circuit with multilevel interconnect. A method of operating a computer system to improve via electromigration in an integrated circuit with multilevel interconnect using via priority groups.

18 Claims, 6 Drawing Sheets

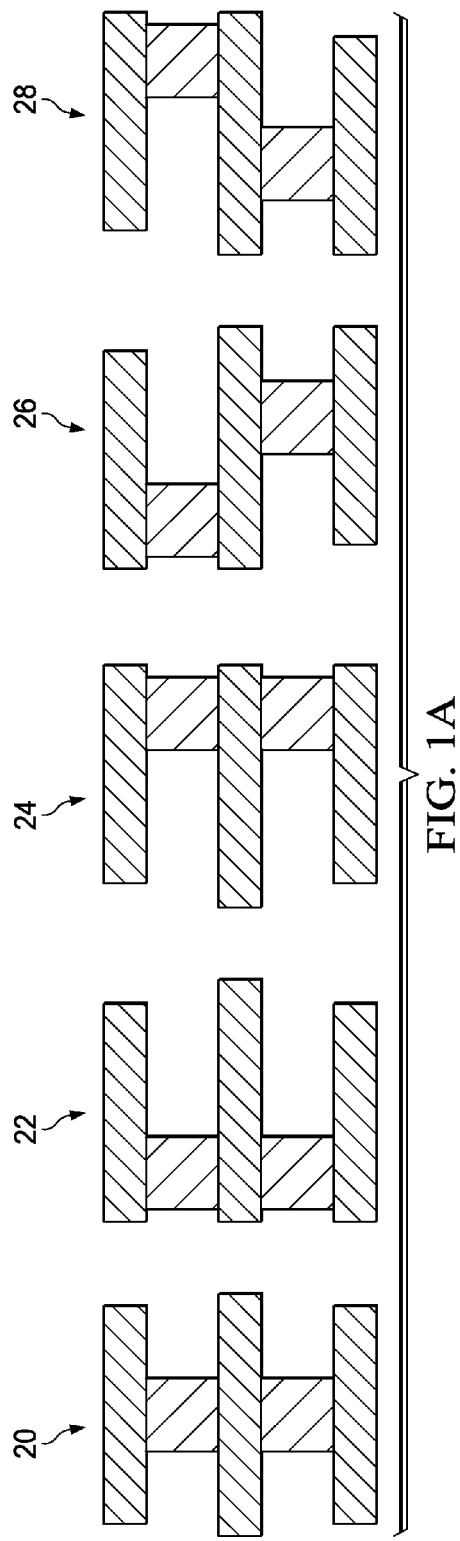
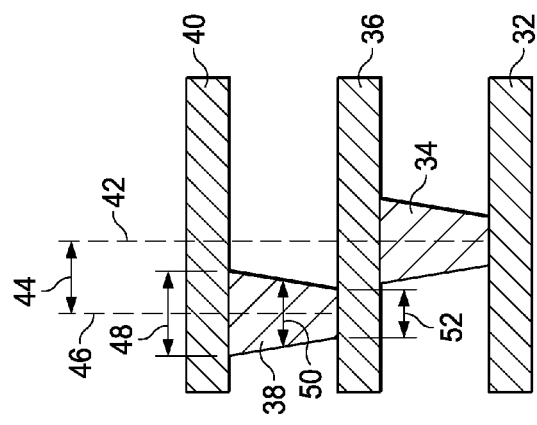
FIG. 1A
FIG. 2

MULTILEVEL VIA PLACEMENT WITH IMPROVED YIELD IN DUAL DAMASCENE INTERCONNECTION

CROSS-REFERENCE TO RELATED APPLICATIONS

This application claims the benefit of priority under U.S.C. §119(e) of U.S. Provisional Application 61/921,891 (Texas Instruments, filed Dec. 30, 2013), the contents of which are hereby incorporated by reference.

FIELD OF INVENTION

This invention relates to the field of integrated circuits. More particularly, this invention relates to the optimization of via placement for improved yield in integrated circuits with multiple levels of interconnect.

BACKGROUND

Modern integrated circuits use multiple levels of interconnect to connect individual devices together. Common types of interconnects include aluminum (Al) alloy interconnect lines and copper (Cu) interconnect lines. Upper layers of interconnect are coupled to additional layers of interconnect above and below through vias. In order to reduce interconnect resistance as the interconnect leads are scaled to smaller and smaller dimensions, the semiconductor industry is moving away from blanket deposition and etch of Al-based metallization and towards damascene interconnect structures with Cu-based metallization.

A major reliability concern in today's integrated circuits is failure of metallic interconnects due to electromigration. Studies have shown that via plugs are places of atomic flux divergence, making them a primary electromigration reliability concern. Electromigration imposes limits on the maximum allowed current through inter connects. Electromigration is electric current-induced metal self-diffusion. In places where atoms are depleting a more tensile stress develops, while in places where atoms are accumulating a more compressive stress develops. If tensile stresses become sufficiently large, voids form. Additional metal void growth under continued electromigration during normal circuit operation may lead to interconnect failure. Similarly, if compressive stresses become sufficiently large, metallic extrusions may form which may result in the shorting of one interconnect lead to an adjacent interconnect lead.

One common design for manufacturing (DFM) method to improve via electromigration reliability in multilevel interconnect is to add redundant vias where there is room. In circuits known to carry large currents, redundant vias may be required by design rules. Instead of making electrical connection with one via between a lower and upper level of interconnect two or more redundant vias may be used to reduce the current through any one via.

SUMMARY

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to a more detailed description that is presented later.

A computer system is used to improve via electromigration in an integrated circuit with multilevel interconnect. A computer system is used to improve via electromigration in an integrated circuit with multilevel interconnect using via priority groups.

BRIEF DESCRIPTION OF THE DRAWINGS

FIG. 1A are stacked via test structures

FIG. 2 is a cross section of a stacked via test structure illustrating an R-stack.

DETAILED DESCRIPTION OF EXAMPLE EMBODIMENTS

This invention will be described in connection with one or more of its embodiments, namely as implemented into a computer system programmed to optimize via placement in a multilevel interconnect integrated circuit to improve yield and to improve electromigration reliability. It is contemplated that the via placement optimization performed according to this invention will be beneficial in yield enhancement and reliability enhancement for various effects other than those described herein. Accordingly, it is to be understood that the following description is provided by way of example only, and is not intended to limit the true scope of this invention as claimed.

FIG. 1A shows five example test structures (20, 22, 24, 26, 28) of an intermediate level of interconnect connected to a lower level of interconnect by a bottom via and connected to an upper level of interconnect by a top via. In the first three example test structures, 20, 22, and 24, the top via is stacked directly on the bottom via. In the first example 20, both vias are in the center of the interconnects. In the second example 22 both vias are near the left end of the interconnects and in the third example 24 the vias are near the right end of the interconnects. In the third 26 example, the bottom via is in the center of the interconnects and the top via is at the left end of the interconnects. In the fourth example 28, the bottom via is in the center of the interconnects and the top via is at the right end of the interconnects.

Figure 1B:
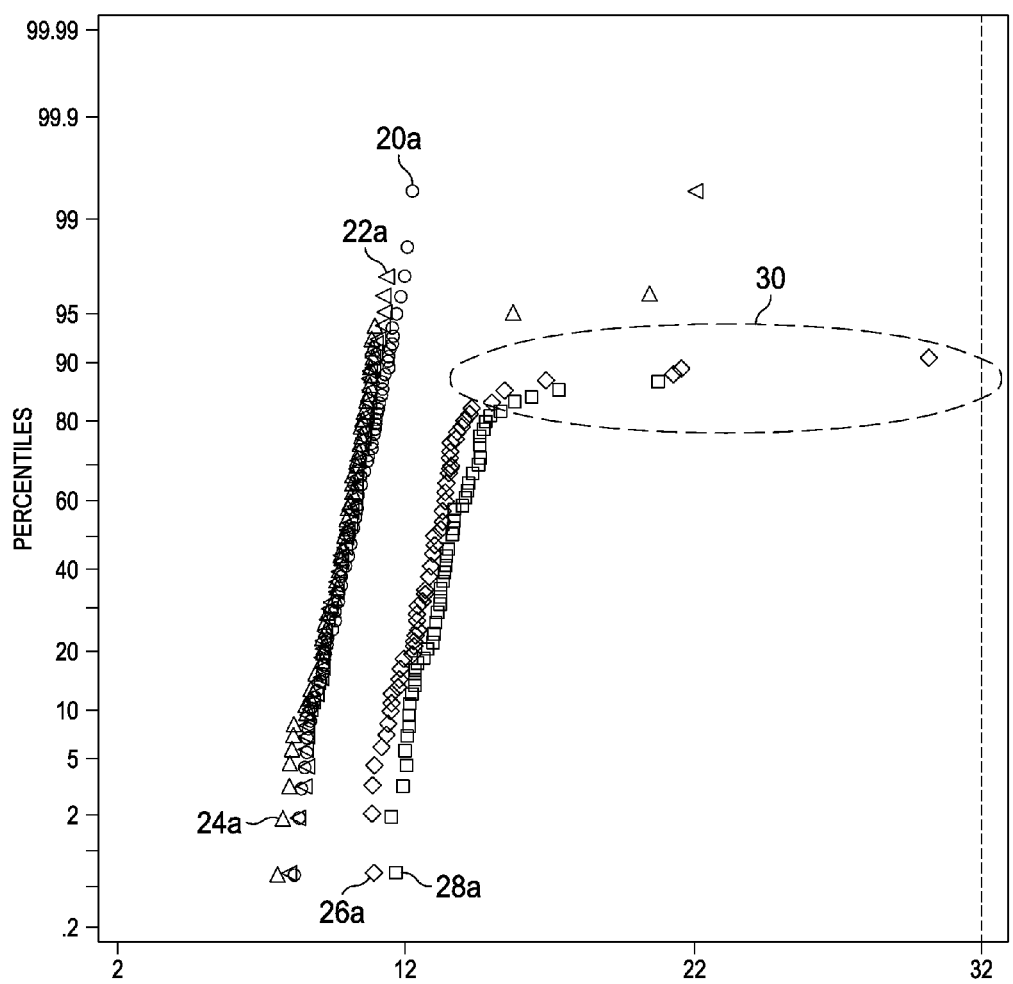
FIG. 1B is a cumulative probability plot of the resistance of stacked vias formed according to principles of the invention.

FIG. 1B shows cumulative probability plots (20a, 22a, 24a, 26a, 28a) of the resistance of via test structures, (20, 22, 24, 26, 28) respectively after electrical stress (current run through the test structures for an extended time.) for hundreds of these via test structures from multiple wafers and multiple lots. The cumulative probability distributions 20a, 22a, 24a for the test structures with the top vias stacked directly on the bottom vias, 20, 22, and 24 are linear with tight distributions of resistance and with few outliers whereas the cumulative probability distributions 26a and 28a for the test structures with the top via offset from the bottom via are nonlinear with broader distributions of resistance and with a significant number of outliers 30. These outlier vias have higher resistance which may cause an integrated circuit to fail.

An example stacked via test structure is shown in FIG. 2. A series of test structures in which the top via 38 is offset from the bottom via 34 are placed on a test chip. The distance 44 between the center 42 of bottom via 34 and the center 46 of the top via 38 was varied from zero to significantly greater than twice the top diameter 48 of the top via 38. When the distance 44 exceeds the mid height diameter 50 of the top via 38 the cumulative probability distribution of resistance of the test structure begins to broaden and become nonlinear. When this occurs more outliers with significantly higher via resistance are generated. The mid height via size 50 is defined as the average of the bottom diameter 52 and the top diameter 48 of the top via 38.

The term "R-stack" refers to a stacked via structure where the distance 44 between the center 46 of the top via 38 and the center 42 of the bottom via 34 is less than or equal to about the top via 38 mid height size 50. Experiments have shown that R-stack via structures have improved resistance to electromigration and have increased reliability.

Figure 3:
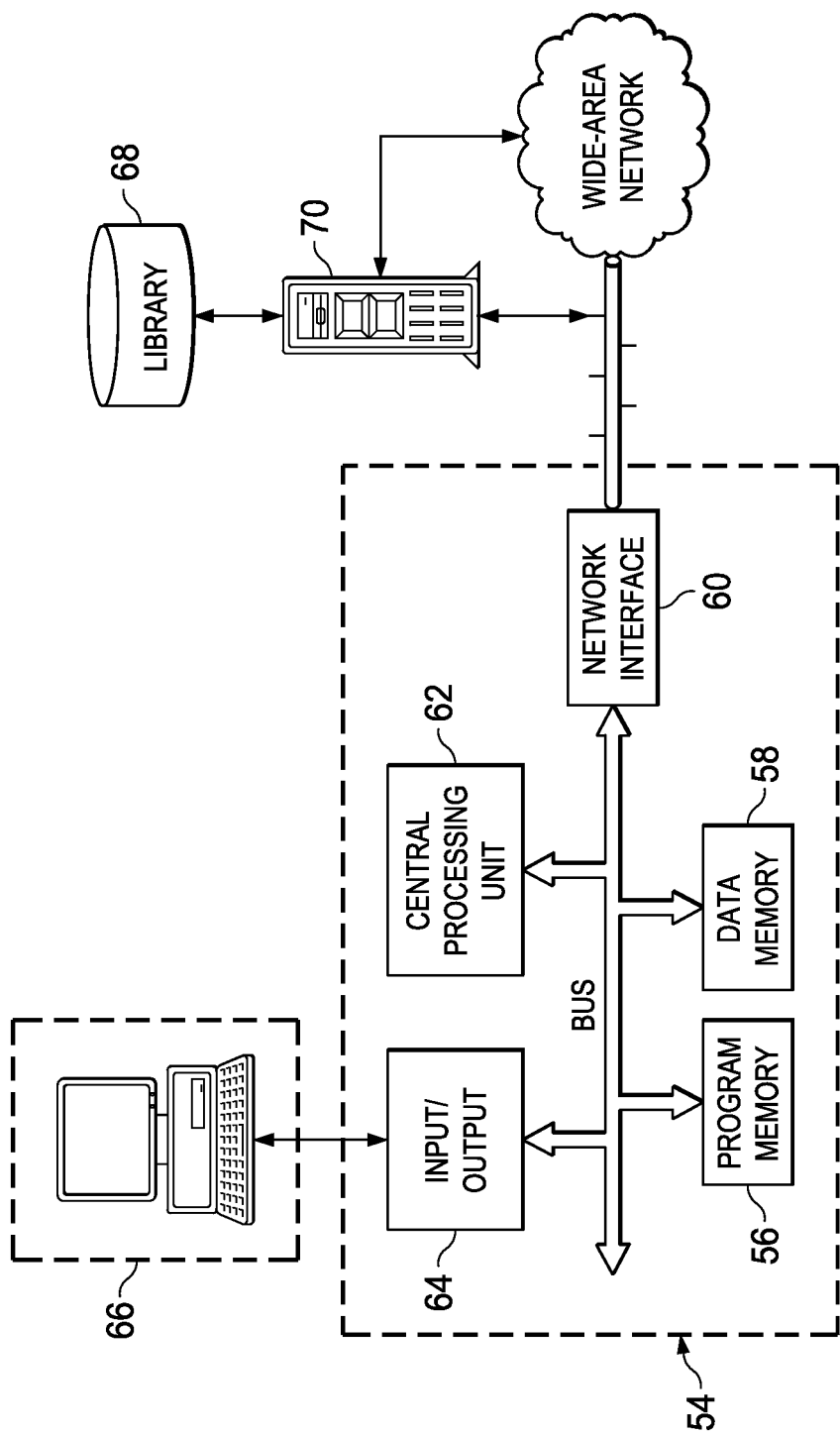
FIG. 3. is a diagram, in schematic form, illustrating a computer system for modifying physical layout data of pattern layers in an integrated circuit according to principles of this invention.

FIG. 3 illustrates the construction of a computer system 54 that may be used to modify physical layout data of integrated circuit interconnection layers and via layers according to embodiments of the invention. In this example, the layout modification system is as realized by way of a computer system including workstation 54 connected to server 70 by way of a network through network interface 60. The particular architecture and construction of a computer system useful in connection with this invention can vary widely. For example, the interconnect and via layout modification system may be realized by a single physical computer, such as a conventional workstation or personal computer, or alternatively may be a computer system implemented in a distributed manner over multiple physical computers. Accordingly, the generalized architecture illustrated in FIG. 3 is provided by way of example only.

As shown in FIG. 3, workstation 54 includes central processing unit (CPU) 62, coupled to the system bus BUS. Also coupled to system bus BUS is input/output interface 64 which refers to those interface resources by way of which peripheral functions 66 (e.g., keyboard, mouse, display, etc.) communicate with the other constituents of workstation 54. CPU 62 refers to the data processing capability of workstation 54, and as such may be implemented by one or more CPU cores or co-processing circuitry. The particular construction and capability of central processing unit 62 is selected according to the application needs of workstation 54. In the architecture of layout modification system according to this example, program memory 56 and data memory 58 are coupled to the system bus BUS. The workstation 54 and server 70 may also be coupled to a library 68 which may store programs, data, and integrated circuit layout patterns such as interconnect layout data and via layout data.

Figure 4:
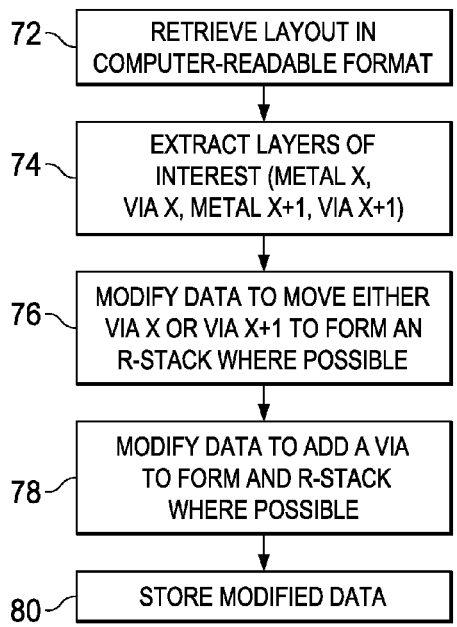
FIGS. 4, 5, 6, 7, and 8 are flow diagrams illustrating the operation of the computer system for modifying physical layout data of pattern layers in an integrated circuit according to principles of this invention.

In an embodiment process illustrated by the flow diagram in FIG. 4 in step 72 the workstation 54 may retrieve pattern data such as data for interconnect levels and via levels from the server 70 or from data storage such as library 68. In step 74 the pattern data from a lower level interconnect 32 pattern, a bottom via 34 pattern, an intermediate level interconnect 36 pattern, a top via 38 pattern and an upper level interconnect 40 pattern are extracted into a format such as gds, ascii, or laff that may be manipulated by in the workstation 54.

In step 76, the embodiment process may then use an algorithm to check for bottom vias 34 in a neighborhood of a top via 38. If there is a bottom via 34 in the neighborhood, it may then determine if either the top 38 or bottom via 34 (or both) may be moved to form an R-stack without violating design rules. If possible, the program then moves the bottom via 34, the top via 38, or both top and bottom vias 34 and 38 to form an R-stack.

In step 78, if forming an R-stack by moving either the top via 38 or the bottom via 34 (or both) is not possible, the program may then check to see if a second top 38 or second bottom via 34 may be added to form an R-stack without a design rule violation. If possible, the program will then add a second top or bottom via to form an R-stack.

In step 80, after modifying the bottom 34 and top via 38 physical layout data to form R-stacks where possible, the workstation 54 may then write the modified layout patterns back to the server 70. Thereafter, the modified layout patterns are used to fabricate an integrated circuit.

Figure 5:
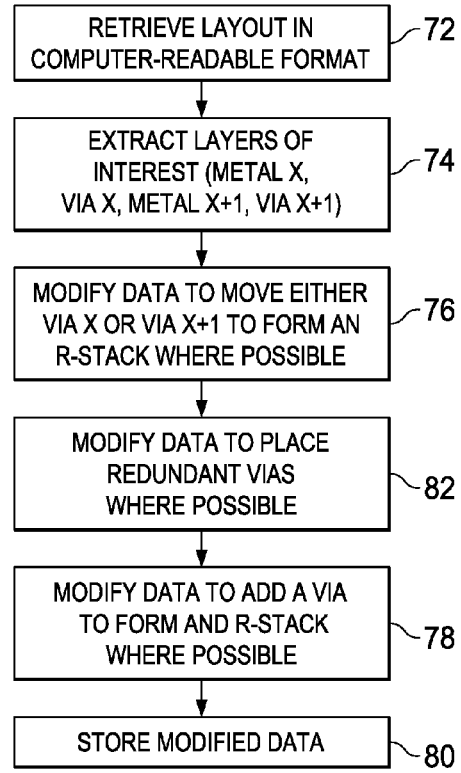

In an embodiment process illustrated by the flow diagram in FIG. 5, the embodiment process performed by workstation 54 may additionally add redundant vias where possible in step 82. The addition of the redundant vias 82 may be performed either before the formation of R-stacks as is illustrated in FIG. 5 or after the formation of R-stacks.

Figure 6:
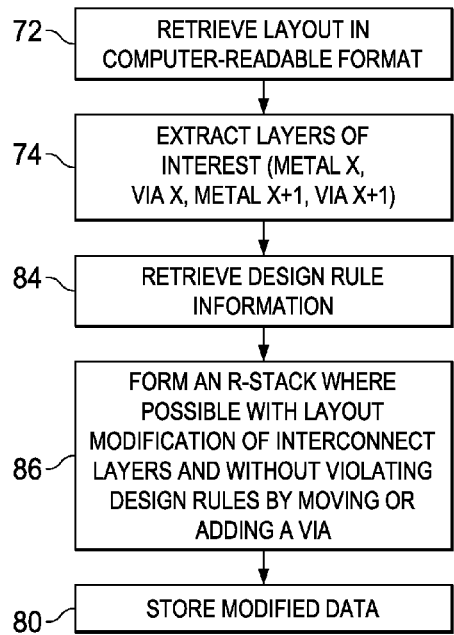

In the embodiment process illustrated by the flow diagram in FIG. 6, the embodiment process performed by workstation 54 may additionally modify the layout 86 of the interconnection layers 32, 36, 40, to facilitate the formation of an R-stack. For example, if room permits, an interconnection geometry may be widened or may be moved to a new location to enable an R-stack to be formed. Interconnect and via design rule information may be retrieved in step 84 to ensure changes to the layout of the interconnect, 32, 36, 40 and via layers, 34 and 38, do not result in a design rule violation.

Figure 7:
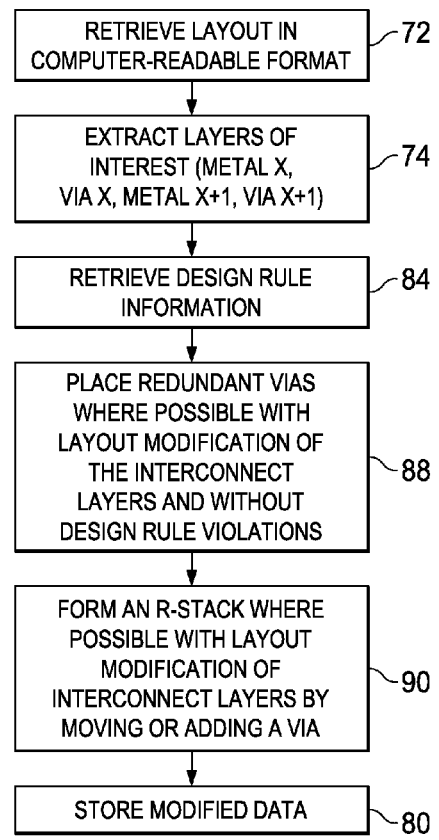

In the embodiment process illustrated by the flow diagram in FIG. 7, the embodiment process performed by workstation 54 may additionally modify the physical layout data 84 of the interconnection layers to enable the placement of redundant vias 86 and to enable the addition of a top 38 or bottom via 34 to form an R-stack 88. Design rule information may also be retrieved by the workstation 54 to enable the embodiment procedure to ensure changes to the layout of the interconnect and via layers do not cause a design rule violation.

Typically in an integrated circuit some interconnection pathways and vias carry significantly more current than other interconnection pathways and vias. As shown in the embodiment in FIG. 8 this information may also be read into the workstation 36 as shown in step 98 and used to prioritize vias according to the current density in the vias. Vias with higher current density are more likely to fail due to electromigration. Vias with the highest current density may form a via group with highest priority and vias with a lesser current density may form a via group with lower priority. Any number of via groups may be formed depending upon the number of current density bin ranges chosen. As illustrated in the embodiment process in FIG. 8, the physical layout data for vias with the highest priority (highest current density) may be modified first to place redundant vias 102 or to form R-stacks 104. The physical layout of an interconnection layer may also be modified to enable the formation of an R-stack containing vias in the highest priority via group. The interconnection layout modification for the highest priority via group may prevent the formation of R-stacks 112 or the placement of redundant vias 110 for via groups with lower priority.

Figure 8:
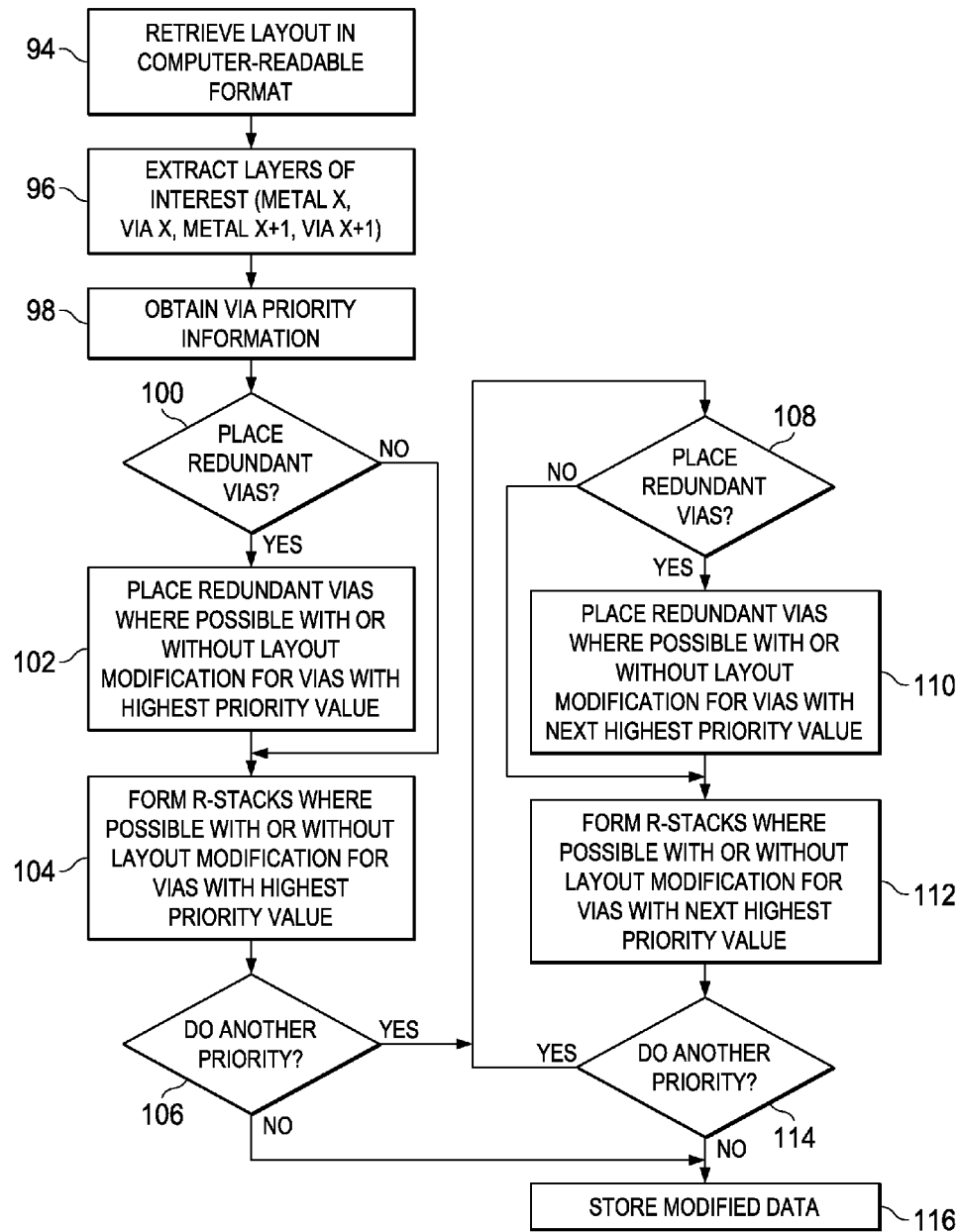

In the example embodiment process illustrated in FIG. 8 the integrated circuit layout is read into the workstation 54 in step 94 and the layers of interest (lower interconnect, bottom via, intermediate interconnect, top via, and upper interconnect for example) are extracted in step 96 into a format such as gds, ascii, or laff that can be manipulated in the CPU 62.

In step 98 via priority group information may be read into the workstation 54. Alternatively, current information for each via may be read into the workstation 54, and via priority bins may be calculated by the workstation using binning criteria that may be listed in the program or may be input via a peripheral 66.

In the illustrative embodiment a decision is made in step 100 whether to place redundant vias. Steps 100 and 102 may be omitted and the procedure may go directly from step 98 to step 104 if redundant vias are not to be placed. The order of placing redundant vias and forming R-stacks may be reversed.

After forming R-stacks in the highest priority via group in step 104, the decision is made in step 106 whether to repeat the procedure on another group of vias with a lower priority. If the answer is no the process is transferred to step 116 and the modified layout databases may be written to the server 70 or library 68 storage area.

If the answer is yes, however, the process is transferred to step 108 and the decision is made in step 108 if redundant vias are to be placed within the next lower priority via group. If the answer is yes the procedure goes to step 110 to place redundant vias. If the answer is no the procedure goes to step 112 to form R-stacks. As before steps 108 and 110 may be omitted in an implemented embodiment if redundant vias are not to be placed. Also if placement of redundant vias is in the implemented procedure, the placement of redundant vias may be performed either before or after R-stack formation.

In step 114 the decision is again made if another priority via group is to be processed or not. If yes the procedure goes to step 108 and steps 108 through 114 are again repeated as described above. If, however, the answer is no, the process transfers to step 116 and the modified layout layers may be written back to the server 70 or library storage 68. Thereafter, the modified layout layers are used to fabricate the integrated circuit.

Although the embodiment process in FIG. 8 allows for the placement of redundant vias and the formation of R-stacks, the placement of redundant vias need not be part of the embodiment process. In addition, if redundant via placement is part of the process it may be performed before or after the formation of the R-stacks. Also, modification of the interconnect layers to accommodate addition of redundant vias or the formation of R-stacks need not be performed. Design rule information may also be retrieved from the library 46 or server 44 and used to ensure changes made to the physical data layout of the via and interconnect layers do not violate design rules.

The embodiment procedures described above may significantly improve the reliability and yield of an integrated circuit with multiple levels of damascene interconnect.

Those skilled in the art to which this invention relates will appreciate that many other embodiments and variations are possible within the scope of the claimed invention.

What is claimed is:

1. A method of fabricating an integrated circuit comprising the steps of:
    retrieving via layout data associated with a top via layer and a bottom via layer of the integrated circuit wherein the top and the bottom vias are coupled to an intermediate interconnect level; and
    performing a first modification of via layout data of at least one of the top via layer and the bottom via layer to form an R-stack; and
    then, using the via layout data to fabricate the R-stack in the integrated circuit.

2. The method of claim 1, wherein the step of performing a first modification further comprises moving a position of at least one via of the top and the bottom via layers to form the R-stack.

3. The method of claim 1, wherein step of performing a first modification further comprises adding one redundant top via or one redundant bottom via to the via layout data of the top via layer or the bottom via layer to form the R-stack.

4. The method of claim 1, wherein the R-stack is formed by:
    providing a half height diameter of a top via;
    determining a center of the bottom via in the via layout data of the bottom via;
    determining a center of the top via in the via layout data of the top via;
    moving the position of at least one of the top via and the bottom via in the via layout data so that the distance from the center of the top via to the center of the bottom via is less than or equal to the half-height diameter.

5. The method of claim 1, further comprising the step of adding a redundant top via or a redundant bottom via to the via layout data prior to fabricating the R-stack in the integrated circuit.

6. The method of claim 1, further comprising the steps of:
    retrieving layout data of a lower interconnect layer;
    retrieving layout data of an intermediate interconnect layer;
    retrieving layout data of an upper interconnect layer;
    enabling an R-stack to be formed by performing a first modification of the layout data of at least one of the lower interconnect layer, the intermediate interconnect layer, and the upper interconnect layer; and
    then, fabricating the lower interconnect layer, the intermediate interconnect layer or the upper interconnect layer using the layout data in the integrated circuit.

7. The method of claim 6, further comprising enabling a redundant via to be added by performing a second modification of the via layout data prior to fabricating the R-stack in the integrated circuit.

8. A method of fabricating an integrated circuit comprising the steps of:
    loading via priority group data into a computer system wherein a highest priority via group contains vias which carry a highest current density during operation of the integrated circuit;
    selecting the via group with the highest priority;
    loading top via layout data and bottom via layout data for vias in the highest priority via group wherein the vias in the top and the bottom via layout data are both connected to an intermediate interconnect layer;
    performing a first modification of the via layout data of at least one of the top and the bottom via layers to form an R-stack; and
    after performing the first modification, fabricating the integrated circuit with the via layout data.

9. The method of claim 8, wherein the R-stack is formed by:
    providing a half height diameter of a top via;
    determining a center of the bottom via in the via layout data of the bottom via;
    determining a center of the top via in the via layout data of the top via;

moving the position of at least one of the top via and the bottom via in the via layout data so that the distance from the center of the top via to the center of the bottom via is less than or equal to the half-height diameter.

10. The method of claim 8, further including a step of performing a second modification on the via layout data of at least one of the vias in the top via layout data or the bottom via layout data to add at least one redundant top via or one redundant bottom via prior to fabricating the R-stack in the integrated circuit.

11. The method of claim 8, further comprising the steps of:
loading lower interconnect layout data into the computer;
loading intermediate interconnect layout data into the computer;
loading upper interconnect layout data into the computer;
loading design rule data into the computer; and
verifying no design rules are violated after the step of performing a first modification.

12. The method of claim 8, further comprising the steps of:
loading lower interconnect layout data into the computer;
loading intermediate interconnect layout data into the computer;
loading upper interconnect layout data into the computer; and
performing a first modification on the layout data of at least one of the lower interconnect, the intermediate interconnect, and the upper interconnect to enable an R-stack to be formed.

13. The method of claim 8, further comprising the steps of:
loading lower interconnect layout data into the computer;
loading intermediate interconnect layout data into the computer;
loading upper interconnect layout data into the computer; and
performing a second modification on the layout data of at least one of the lower interconnect, the intermediate interconnect, and the upper interconnect to enable a redundant via to be placed.

14. The method of claim 8, further comprising the steps of:
selecting a lower priority via group;
loading top via layout data from the lower priority via group into the computer;
loading bottom via layout data from the lower priority via group into the computer; and
performing a first modification of at least one of the top via layout data and the bottom via layout data to form a lower priority R-stack; and
then, using the top and bottom via layout data to fabricate the lower priority R-stack in the integrated circuit.

15. The method of claim 8, further comprising the steps of:
selecting a lower priority via group;
loading top via layout data from the lower priority via group into the computer;
loading bottom via layout data from the lower priority via group into the computer; and
performing a second modification of at least one of the top via layout data and the bottom via layout data to add at least one redundant top via from the lower priority via group or at least one redundant bottom via from the lower priority via group prior to fabricating the lower priority R-stack in the integrated circuit.

16. The method of claim 8, further comprising the steps of:
selecting a lower priority via group;
loading lower interconnect layout data into the computer wherein the lower interconnect is coupled to a bottom via from the lower priority via group;
loading intermediate interconnect layout data into the computer wherein the intermediate interconnect is coupled to at least one of a bottom via and a top via from the lower priority via group;
loading upper interconnect layout data into the computer wherein the upper interconnect layer is coupled to a top via from the lower priority via group;
performing a first modification on the layout data of at least one of the lower interconnect layout data, the intermediate interconnect layout data, and the upper interconnect layout data to enable the lower priority R-stack to be formed prior to fabricating the lower priority R-stack in the integrated circuit.

17. The method of claim 8, further comprising the steps of:
loading lower interconnect layout data into the computer wherein the lower interconnect is coupled to a bottom via from the lower priority via group;
loading intermediate interconnect layout data into the computer wherein the intermediate interconnect is coupled to at least one of a bottom via or a top via from the lower priority via group;
loading upper interconnect layout data into the computer wherein the upper interconnect layer is coupled to a top via from the lower priority via group;
performing a second modification on the layout data of at least one of the lower interconnect layout data, the intermediate interconnect layout data, and the upper interconnect layout data to enable at least one redundant top via with lower priority or at least one redundant bottom via with lower priority to be formed.

18. The method of claim 8, further comprising the steps of:
loading current density data regarding the current density in each via during operation of said integrated circuit into the computer;
forming via priority groups according to range of current density in the top and the bottom vias; and
prioritizing said via priority groups wherein the highest priority via group contains vias with the highest current density.

* * * * *